United States Patent
Biffard et al.

(10) Patent No.: US 9,509,186 B2
(45) Date of Patent: Nov. 29, 2016

(54) REDUCED WEIGHT ROTOR HAVING STRUCTURAL INTEGRITY

(71) Applicant: Zero Motorcycles, Inc., Scotts Valley, CA (US)

(72) Inventors: Ryan John Biffard, Soquel, CA (US); Abraham Askenazi, San Jose, CA (US)

(73) Assignee: Zero Motorcycles, Inc., Scotts Valley, CA (US)

( * ) Notice: Subject to any disclaimer, the term of this patent is extended or adjusted under 35 U.S.C. 154(b) by 164 days.

(21) Appl. No.: 14/618,821

(22) Filed: Feb. 10, 2015

(65) Prior Publication Data
US 2016/0233733 A1 Aug. 11, 2016

(51) Int. Cl.
*H02K 1/30* (2006.01)
*H02K 1/27* (2006.01)
*H02K 1/28* (2006.01)
*H02K 1/32* (2006.01)

(52) U.S. Cl.
CPC ............... *H02K 1/30* (2013.01); *H02K 1/276* (2013.01); *H02K 1/28* (2013.01); *H02K 1/32* (2013.01)

(58) Field of Classification Search
CPC ........... H02K 1/30; H02K 1/32; H02K 1/276
See application file for complete search history.

(56) References Cited

U.S. PATENT DOCUMENTS

| 6,717,315 | B1* | 4/2004 | Tajima | H02K 1/278 310/156.45 |
| 2010/0133932 | A1* | 6/2010 | Zhang | H02K 1/2786 310/59 |
| 2012/0074805 | A1* | 3/2012 | Takizawa | H02K 1/276 310/156.01 |
| 2014/0203674 | A1* | 7/2014 | Cao | H02K 1/32 310/54 |
| 2014/0225471 | A1* | 8/2014 | Kawanami | H02K 1/2706 310/156.53 |
| 2015/0256038 | A1* | 9/2015 | Nigo | H02K 1/276 62/498 |

\* cited by examiner

*Primary Examiner* — Dang Le
(74) *Attorney, Agent, or Firm* — Gard & Kaslow LLP

(57) ABSTRACT

A reduced weight rotor design for use in an electric motor where the reduced weight rotor maintains its structural integrity. The reduced weight rotor includes a center hub, an outer ring having lobed portions extending inwardly towards the hub and located adjacent to each location of a magnetic pole pairing, and spokes connecting the hub to the outer ring where the spokes are arranged in a number of pairs equal to the total number of the magnetic pole pairings and wherein each spoke of a given pair does not cross each other spoke of the given pair but does cross a spoke of an adjacent pair thereby forming a one cross spoke pattern.

14 Claims, 7 Drawing Sheets

REDUCED WEIGHT ROTOR HAVING STRUCTURAL INTEGRITY

BACKGROUND OF THE INVENTION

Field of the Invention

The present invention relates generally to electric motors and, more particularly, to a reduced weight rotor for use in such motors.

Description of the Prior Art

Electric motors have been in existence for over one hundred years now. Despite this, today there is a renewed interest in them due to an ever-increasing concern about the environmental impact of other forms of power generation such as gasoline engines.

One known form of electric motors is commonly referred to as a brushless permanent magnet motor due to its design and operation. Referring now to FIG. 1, a simplified diagram of just such an electric motor can be seen. As shown in the figure, motor 100 comprises a stationary part referred to as a stator 102 and a rotating part referred to as a rotor 104. In this example, stator 102 includes three separate phase wire windings, labeled phase A wire winding 106, phase B wire winding 108, and phase C wire winding 110 in the figure, each of which includes wire wound around an armature, known as a tooth, of stator 102. As is known in the art, the space along the stator between two neighboring teeth is commonly referred to as a slot. As also shown in this example, rotor 104 includes two permanent magnet poles labeled magnet N 112 (for North) and magnet S 114 (for South), about its periphery. This stator and rotor electric motor configuration is known as an "inrunner" because the rotor is located inside the stator (versus an "outrunner" where the physical relationship between the stator and rotor is reversed) and, in either configuration, the physical space or gap between the teeth of stator 102 and the permanent magnets of rotor 104 is commonly referred to as an air gap.

In operation, a motor controller (not shown) provides electric current across the three winding phases (e.g., phase A wire winding 106, phase B wire winding 108, and phase C wire winding 110) in a sequential fashion around stator 102 thus making it a three-phase motor. As current is running through a given wire winding it generates a local magnetic field which then repels and/or attracts any nearby permanent magnets such as permanent magnet N 112 and permanent magnet S 114 of rotor 104 thereby causing rotor 104 to spin or rotate about its axis. In this way, electric motor 100 can be applied to a variety of uses by, for example, having a drive gear (not shown) located on a spinning shaft 116 at the axis of rotor 104.

In further explanation and by way of example, the motor controller (not shown) applies a positive voltage to one end of the phase A wire winding 106 and a negative voltage to one end of the phase B wire winding 108. This voltage differential creates an electric current from the one end of the phase A wire winding 106 to a "Wye" termination and then to the one end of the phase B wire winding 108 because, as shown in the figure, the other ends of the phase A wire winding 106 and the phase B wire winding 108 (as well as that of one of the ends of the phase C wire winding 110) are electrically connected in the form of a "Wye" termination, a form of termination connection known in the art. This electric current, as explained above, creates a magnetic field surrounding the wire windings, such as phase A wire winding 106 and phase B wire winding 108. These magnetic fields repel (and/or attract, as the case may be) respective ones of magnet N 112 and/or magnet S 114 thereby causing rotor 104 to spin about it axis. The motor controller then applies a voltage differential across one end of the phase B wire winding 108 and one end of the phase C wire winding 110 causing rotor 104 to continue to spin. The motor controller then applies a voltage differential across one end of the phase C wire winding 110 and one end of the phase A wire winding 106 causing rotor 104 to further continue to spin. This process is repeated thus continuing to cause rotor 104 to spin or rotate within stator 102.

It is to be understood that the diagram of motor 100 of FIG. 1 is a simplified form of such an electric motor. As is known in the art, increasing the size and number of the active motive elements, such as the size of the stator and the number of windings (as well as the number of wire windings on each tooth) on the stator and the size of the rotor and the number (and power) of magnets on the rotor, increases the motive force or power of the electric motor. Therefore, in practice, it is common for each of the phase wire windings to be duplicated (so that there is more than one phase A wire winding 106, more than one phase B wire winding 108, and more than one phase C wire winding 110) at additional teeth locations around a stator thereby providing additional magnetic fields to repel (and/or attract) any magnets on a rotor. Likewise, it is common for each of the magnets of a rotor to be duplicated (so that there is more than one N magnet 112 and more than one S magnet 114) thereby providing additional magnets to be repelled (and/or attracted) by a stator's wire windings.

Referring now to FIG. 2, an exploded diagram of an electric motor 200 of the prior art can be seen. As shown, electric motor 200 includes a drive end plate 202, a motor casing 204 having radial heat fins for passive air cooling, a stator 206 comprising a set of stacked laminations and wire windings (not shown), a rotor 208 comprising permanent magnets located about its periphery, and a rear end plate 210.

It is to be understood that the basic physical relationship and operation of these elements in motor 200 is generally as was described with respect to that of motor 100 of FIG. 1. In particular, rotor 208 fits within stator 206, separated by an air gap, both of which then fit within motor casing 204 with drive end plate 202 attached to and closing a front end of motor casing 204 while rear end plate 210 is attached to and closes a rear end of motor casing 204. As has been explained, rotor 208 is then caused to rotate within stator 206, by the application of a voltage differential across the wire windings on stator 206 which repel and/or attract the magnets of rotor 208.

Of course, a given motor may be limited in how physically large it can be for a given use case thus limiting the extent of any increases in active motive material (e.g., the size of the stator, the number of wire windings and/or number of wire windings per tooth, the size of the rotor, and the number and power of the magnets). Further, within any overall size constraints for a given motor, it may be desirable to reduce the motor's weight in order to improve its performance characteristics and/or overall usefulness for a given application.

SUMMARY

In one embodiment is a reduced weight rotor for a permanent magnet electric motor, the reduced weight rotor comprising a hub, an outer ring configured to hold multiple magnetic pole pairs around a periphery of the outer ring, the outer ring having one lobed portion located adjacent to each one of the multiple magnetic pole pairs, each lobed portion extending inwardly toward the hub, and multiple pairs of spokes, a total number of the multiple pairs of spokes being equal to the total number of the multiple magnetic pole pairs, wherein each individual pair of the multiple pair of spokes is configured such that, each spoke of the individual pair is connected at one end to one of the outer ring lobed portions not connected to any other spoke and at another end to the hub thereby forming a generally tangential line to the hub, and wherein a counterclockwise spoke of the individual pair and a clockwise spoke of the individual pair do not cross, while the counterclockwise spoke of the individual pair and a clockwise spoke of another pair of the multiple pair of spokes located counterclockwise to the individual pair do cross, thereby forming a one cross spoke pattern of the multiple pair of spokes.

In a further embodiment of the reduced weight rotor the connection of each spoke of the individual pair to one of the outer ring lobed portions is at a mid or high point of the one of the outer ring lobed portions.

In a still further embodiment of the reduced weight rotor the connection of each spoke of the individual pair to one of the outer ring lobed portions is directed towards a center of the magnetic pole pairing located adjacent to the one of the outer ring lobed portions.

In a yet further embodiment of the reduced weight rotor the connection of each spoke of the individual pair to one of the outer ring lobed portions is at a point of maximum flux between pole pairs.

In a yet further still embodiment of the reduced weight rotor each spoke forms a straight line.

In a yet still further embodiment of the reduced weight rotor each spoke forms a small arc.

In a yet further still embodiment of the reduced weight rotor the rotor comprises fillets where spokes cross in the one cross spoke pattern, where spokes connect to the outer ring lobed portions, where spokes connect to the hub, and between adjacent lobed portions.

In an alternative embodiment is a reduced weight rotor for a permanent magnet electric motor, the reduced weight rotor comprising: a hub; an outer ring configured to hold a plurality of magnetic pole pairs around a periphery of the outer ring, the outer ring having one lobe located adjacent to each one of the multiple magnetic pole pairs, each lobe extending inwardly toward the hub; and a plurality of pairs of spokes, wherein the plurality of pairs of spokes is equal to the plurality of magnetic pole pairs, wherein each individual pair of the plurality of pairs of spokes is configured such that, each spoke of the individual pair is connected at one end to a different one of the outer ring lobes, such that each outer ring lobe is connected to only one spoke and each spoke of the individual pair is connected to an adjacent outer ring lobe, and is connected at another end to the hub thereby forming a generally tangential line to the hub, and wherein a counterclockwise spoke of the individual pair and a clockwise spoke of the individual pair do not cross, while the counterclockwise spoke of the individual pair and a clockwise spoke of another pair of the plurality of pairs of spokes located counterclockwise to the individual pair do cross, thereby forming a one cross spoke pattern of the plurality of pairs of spokes.

In a further alternative embodiment of the reduced weight rotor the connection of each spoke of the individual pair to one of the outer ring lobes is at a mid or high point of the one of the outer ring lobes.

In a still further alternative embodiment of the reduced weight rotor the connection of each spoke of the individual pair to one of the outer ring lobes is directed towards a center of the magnetic pole pairing located adjacent to the one of the outer ring lobes.

In a yet further alternative embodiment of the reduced weight rotor the connection of each spoke of the individual pair to one of the outer ring lobes is at a point of maximum flux.

In a yet further still alternative embodiment of the reduced weight rotor each spoke forms a straight line.

In a yet still further alternative embodiment of the reduced weight rotor each spoke forms a small arc.

In a yet further still alternative embodiment of the reduced weight rotor the rotor comprises fillets where spokes cross in the one cross spoke pattern, where spokes connect to the outer ring lobes, where spokes connect to the hub, and between adjacent lobes.

DETAILED DESCRIPTION OF THE INVENTION

Performance of an electric motor can be improved by reducing the weight of the rotor. However, focusing rotor design on weight reduction alone can negatively impact its structural integrity. Conversely, focusing rotor design on structural integrity can increase its weight. By balancing these two design goals, described herein are various embodiments of a rotor for use in an electric motor wherein the rotor has a specific physical shape or design that reduces its weight while maintaining its structural integrity.

There are various benefits to a reduced weight rotor. Due to rotational energy, a rotor having less weight takes less energy to rotate and therefore is quicker. This can be important when motor performance or responsiveness is a consideration. Due to inertia, a rotor having less weight takes less force to stop its rotation. This can be important when such a rotor is used in a motorcycle which may leave and then return to the ground thus causing sudden wheel stoppage which is transmitted back into the motor via the motorcycle's drive mechanism. Due to simple physics, a rotor having less weight shifts the balance between the weight of a motorcycle and its rider resulting in greater maneuverability. And if a rotor takes less material to make it can cost less to manufacture.

Of course, it is generally known to reduce the weight of objects by manufacturing them out of a lighter weight material. However, such a lighter weight material can have less structural integrity and therefore may not be suitable for the object's intended application. For example, with some manufactured objects aluminum may be used instead of steel because of its lighter weight but the resulting object may then lack the required structural integrity. As another example, carbon fiber may be used instead of steel because of its lighter weight but such material, and the manufacturing costs of working with such material, may be cost prohibitive for the given application.

Figure 3:
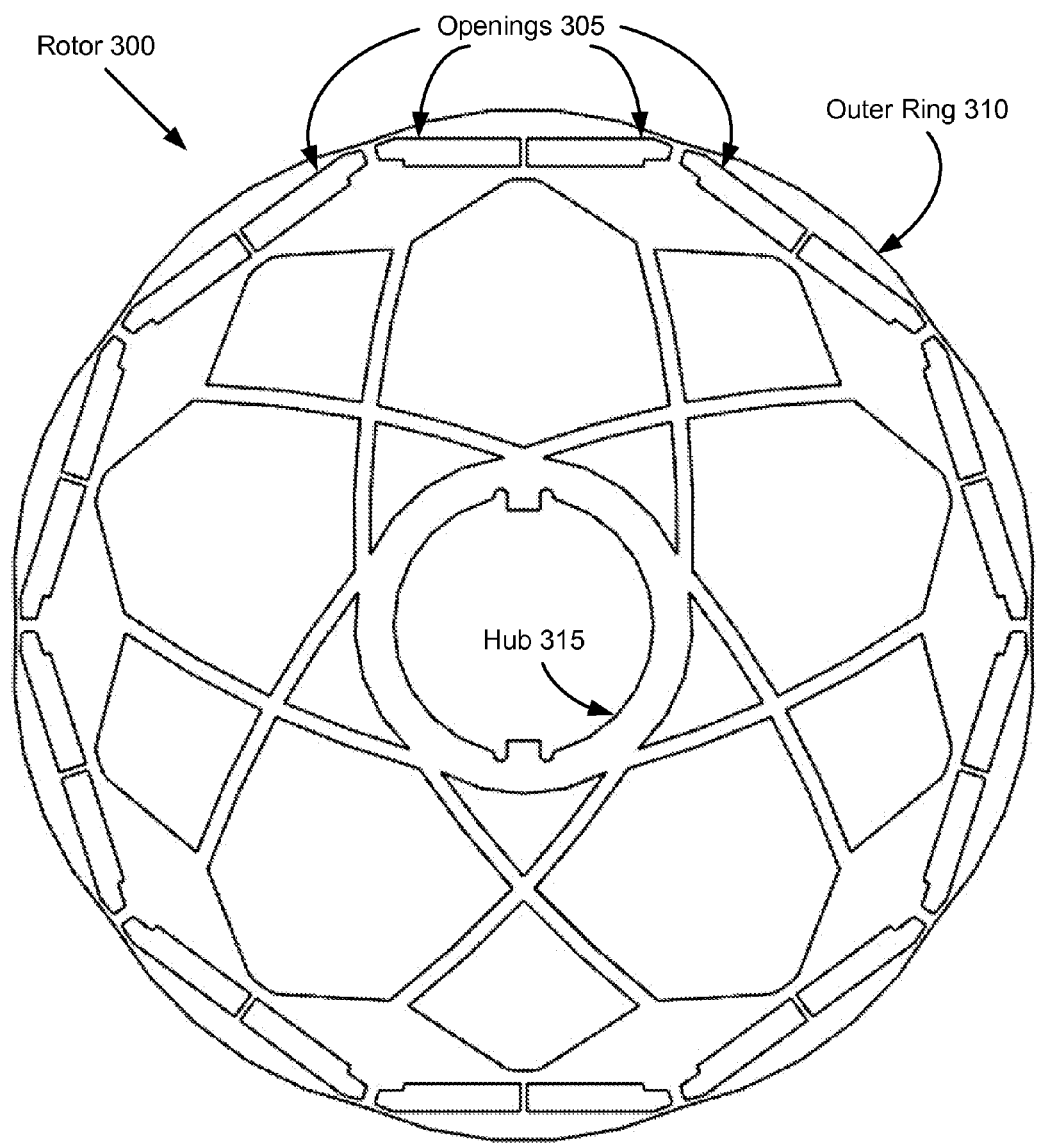
FIG. 3 is an end view of a reduced weight rotor according to one embodiment.

Instead of simply using a lighter weight material, referring now to FIG. 3, an end view of a reduced weight rotor 300 having structural integrity according to one embodiment of the present approach can be seen. Rotor 300 is configured to operate in essentially the same manner as prior art rotors, such as solid rotor 104 and radially spoked rotor 208, by being configured to hold permanent magnets in openings 305 of an outer ring 310 on a periphery of rotor 300 and by having a center hub 315 on an axis of rotor 300. However, unlike rotors of the prior art, rotor 300 has reduced weight while maintaining structural integrity, as explained further herein. Rotor 300 achieves these qualities due to its particular physical design or arrangement, as will now be explained.

Figure 4:
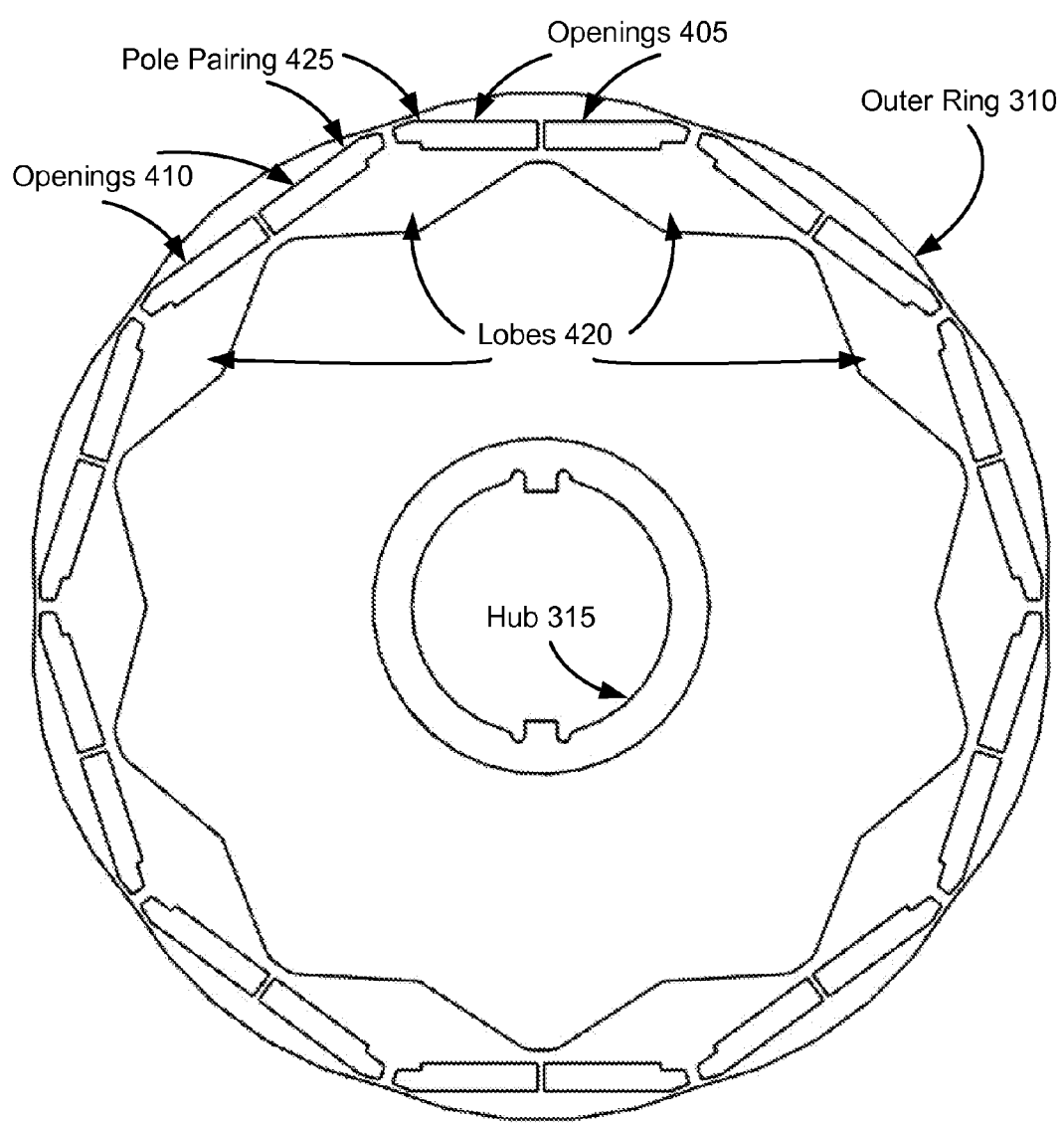
FIG. 4 is an end view of outer ring and hub portions of the reduced weight rotor of FIG. 3.

Referring now to FIG. 4, an end view of the outer ring 310 portion and hub 315 portion of rotor 300 (which is typically made of iron but can be made of other materials as would be understood by one of skill in the art in light of the teachings herein) can be seen to better understand their individual contributions to the design of rotor 300.

In particular, when a shaft (not shown) is located on an axis of hub 315 (and therefore an axis of rotor 300), hub 315 transfers rotational force to the shaft when a motor causes rotor 300 to spin and, likewise, transfers an opposite rotational force to rotor 300 when the shaft causes rotor 300 to slow its spinning. As such, hub 315 operates as a force transfer mechanism between rotor 300 and the shaft.

Figure 1:
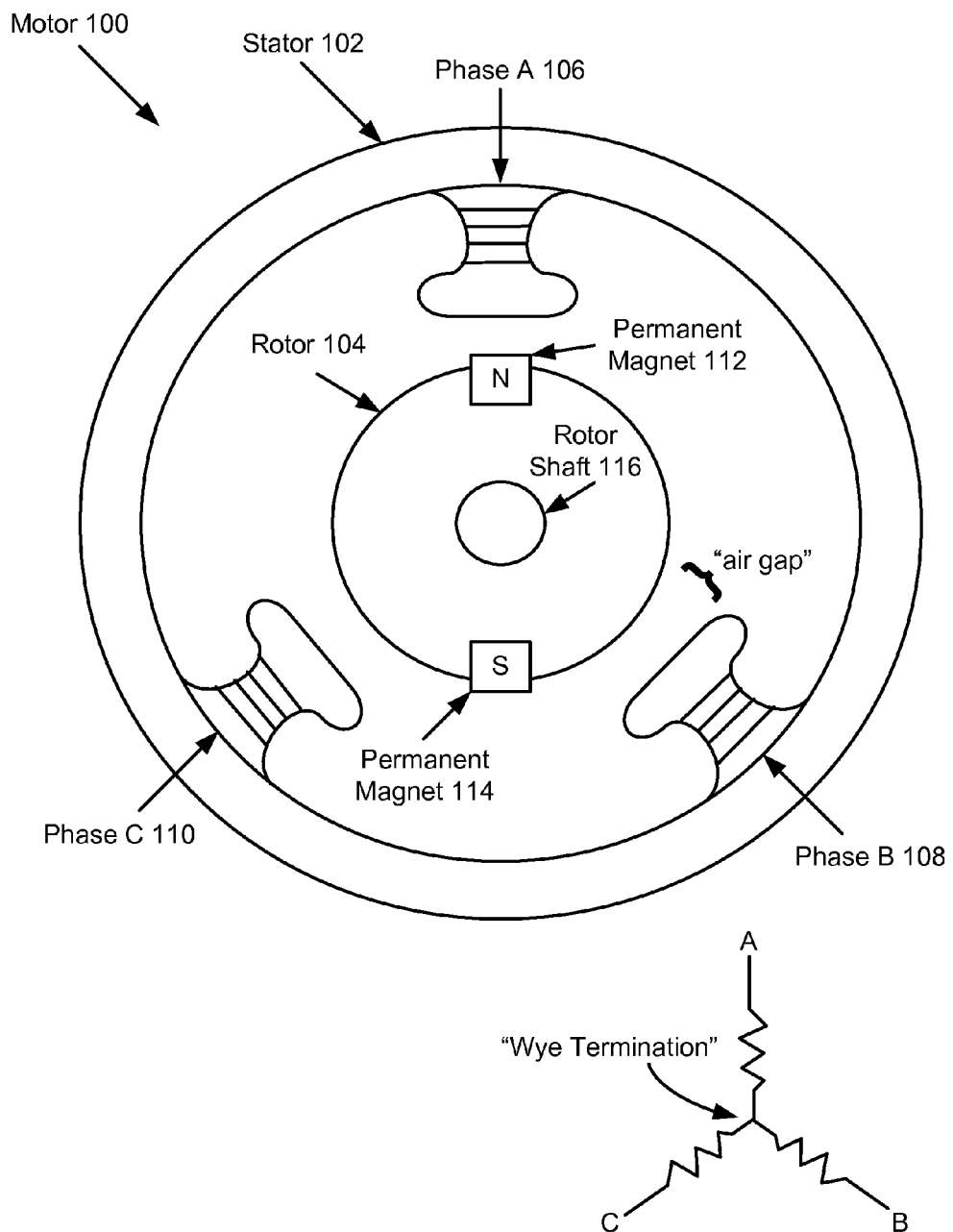
FIG. 1 is a block diagram of an electric motor of the prior art.
Figure 2:
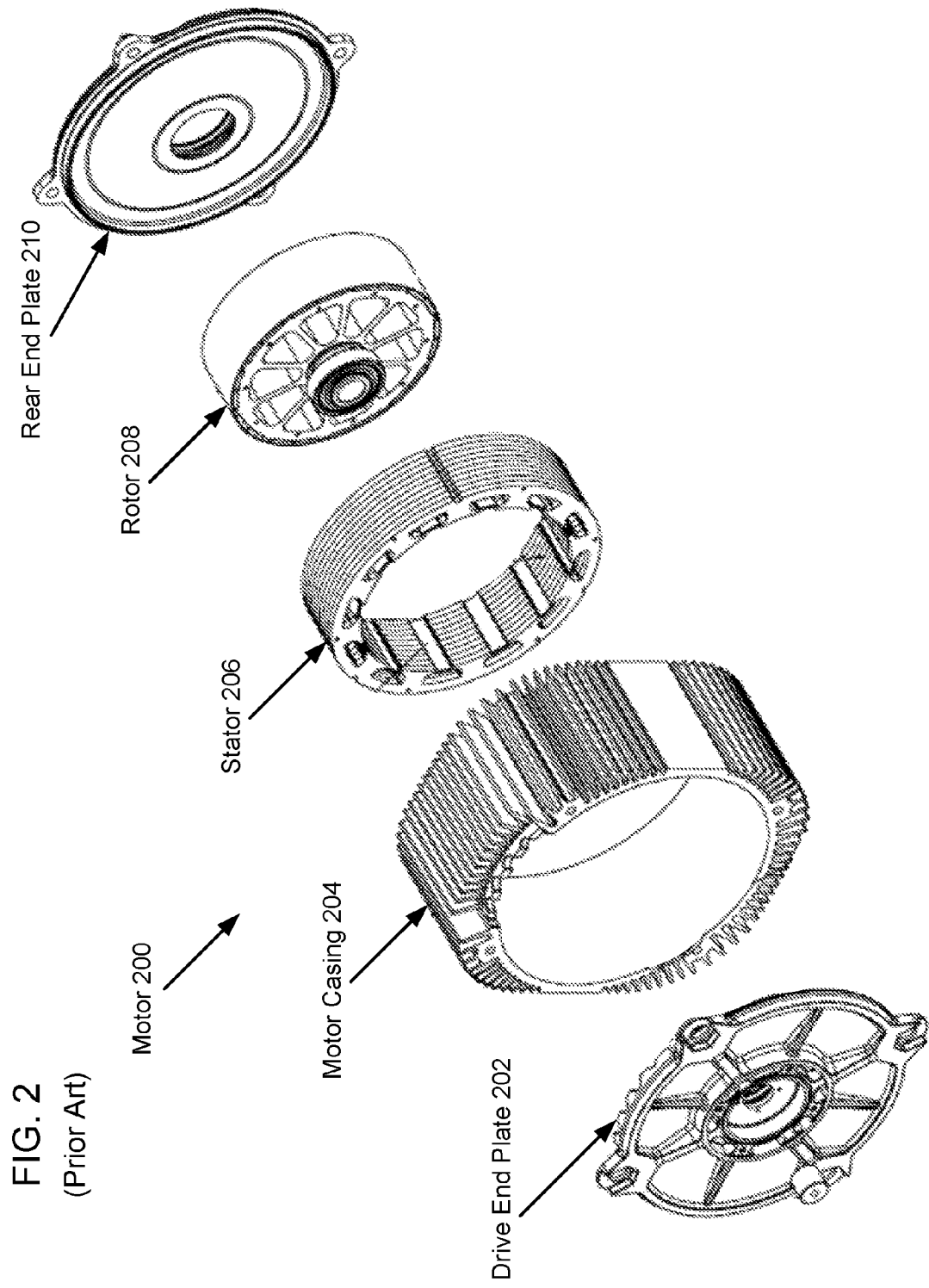
FIG. 2 is an exploded diagram of an electric motor of the prior art.

As was explained above with reference to FIG. 1, when current is applied to a winding of an electric motor's stator, a local magnetic field is generated which then repels and/or attracts any nearby permanent magnets such as those held in openings 305 of outer ring 310 thereby causing rotor 300 to rotate. It is to be noted that outer ring 310 has a particular design shape to better facilitate this, as will now be explained. While an outside diameter of outer ring 310 is shown as having a generally circular shape (which, in combination with a stator, creates an air gap as was explained with reference to FIG. 1), the inner portion of outer ring 310 has a more irregular shape defined by a series of protrusions or lobed portions 420 each facing or directed towards the rotor axis or hub 315. It is to be further noted that each lobe 420 is located adjacent to a magnetic pole pairing 425 of two magnets having opposite polarity (as shown, and as would be understood by one of skill in the art in light of the teachings herein, here a pole is made of two magnets, e.g., magnets of a same polarity in a given set of openings 305, and as such, a pole pairing is one magnet of one pole, e.g., the leftmost or counterclockwise magnet of the two magnets in openings 405, and a neighboring magnet of another pole of an opposite polarity, e.g., the rightmost or clockwise magnet of the two magnets in openings 410; it is to be further understood that the term "pole pairing" is used herein to avoid confusion with the term pole pair, which implies adherence to a known in the art requirement of there being half as many pole pairs as there are poles in a given electric motor design, a requirement not shared by the term pole pairing or the design described herein).

Figure 5:
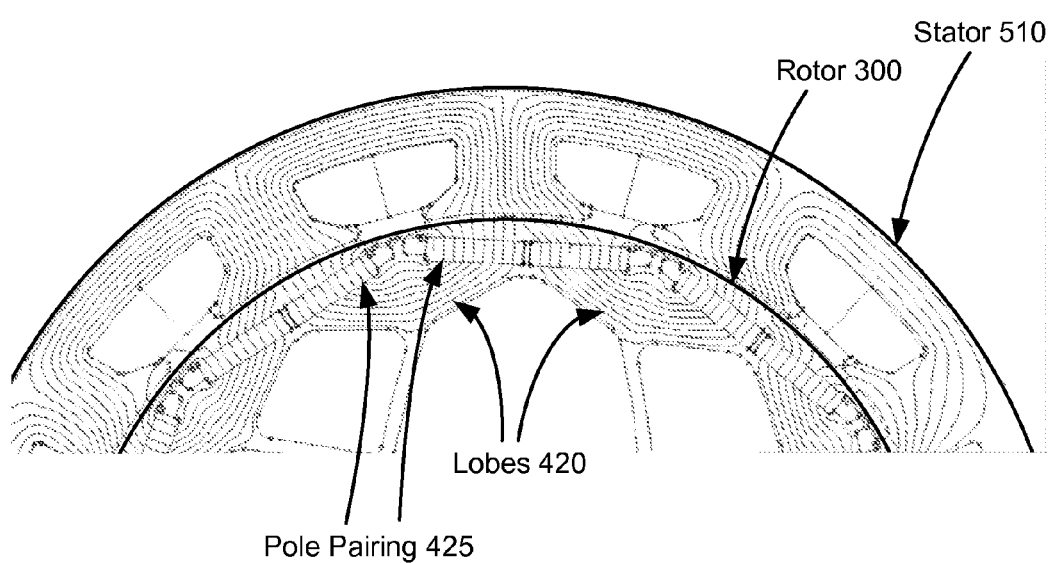
FIG. 5 is an end view of portions of the reduced weight rotor of FIG. 3 alongside portions of a stator with representative magnetic flux lines crossing those portions.

As further explanation of the interaction of the lobes 420 and magnets of rotor 300 and a stator-generated magnetic field, referring now to FIG. 5, an end view of portions of outer ring 310 alongside portions of a stator is shown with representative magnetic flux lines crossing those portions. In particular, rather than having a generally circular inner portion of outer ring 310 with minimal material extending inwardly beyond the magnets, the additional material of each lobe 420 of outer ring 310 serves as a flux ring to maintain a relatively constant flux density of the magnetic field generated by the magnets and stator. This is shown in the figure as magnetic flux lines (referring to the fine parallel circulating topographical-like lines) which, despite being shown for explanation purposes, are not visible to the naked eye, as is understood in the art. As such, the shape of outer ring 310 is neither a simple circular ring shape nor is it some random repeating irregular shape. Rather, outer ring 310 is generally circular on its outer periphery (thereby minimizing a resulting air gap) and is lobed on its inner periphery at the location of each magnetic pole pairing.

Further regarding the physical design of rotor 300, by holding permanent magnets about a periphery of rotor 300, outer ring 310 is affected by a surrounding stator's magnetic field applied to the magnets. In order for this to cause rotor 300 to spin and transfer that force along its axis, that force must be transferred to hub 315. Rotors of the prior art generally accomplished this by being a solid piece of material from outer ring 310 to hub 315 thus indirectly achieving the electromagnetic benefits of lobes 420 of the present approach as well as maximizing structural integrity of the rotor. An alternative to a solid rotor design is rotor 208 which has radial spokes emanating in a straight line from a hub to an outer ring without crossing each other. However, such radial spokes, despite having reduced weight compared to a solid rotor design, have the disadvantage of potentially bending or flexing under load and therefore must be increased in size to provide the needed structural integrity. In contrast, the present approach maintains flux density via the lobes 420 of outer ring 310 and connects the outer ring 310 to hub 315 via spokes that are arranged in a specific one cross spoke pattern to provide structural integrity, as will now be explained.

Figure 6:
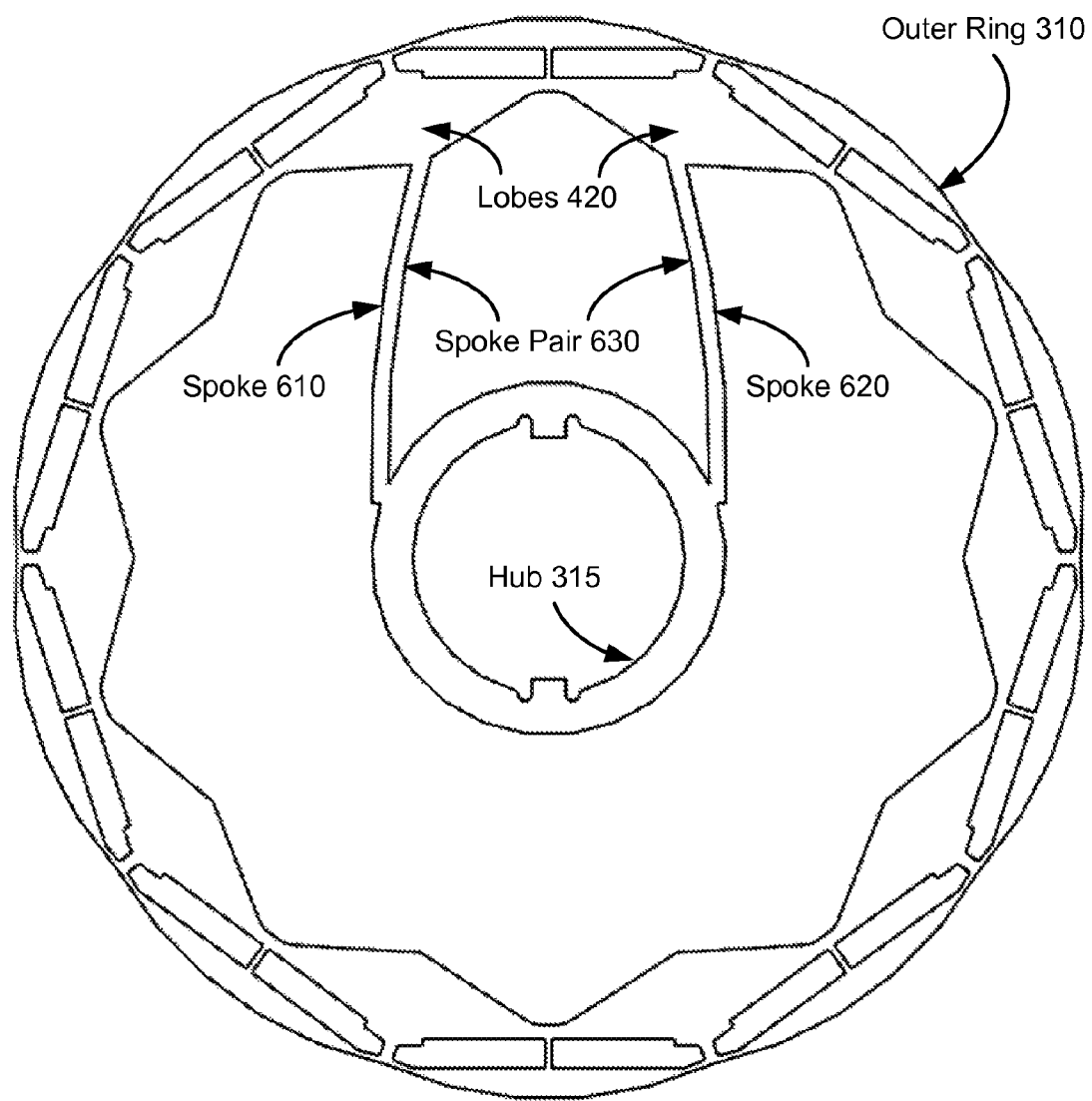
FIG. 6 is an end view of outer ring, hub and spoke portions of the reduced weight rotor of FIG. 3.

Referring now to FIG. 6, an end view of outer ring 310, hub 315, and two spokes 610 and 620 which form a single pair of connecting spokes 630 between outer ring 310 and hub 315, can be seen. It is to be noted that the spoke 610 connects outer ring 310 to hub 315 in a specific manner, as does spoke 620. In particular, spoke 610 connects to outer ring 310 generally at a mid or high point of lobe 420, which is a center of the adjacent pole pairing, and spoke 610 connects to hub 315 in a tangential line to an outer periphery of hub 315. Likewise and as shown, spoke 620 connects to outer ring 310 generally at a mid or high point of another lobe 420, which again is a center of an adjacent pole pairing, and where the other lobe 420 is located adjacent and clockwise to the lobe 420 to which spoke 610 connects. As such, it is to be noted that spoke 610 and spoke 620 of the pair of connecting spokes 630 do not cross each other in connecting outer ring 310 to hub 315.

Further, it is to be noted that each of spoke 610 and 620, in connecting to a mid or high point of lobe 420 (at a center of an adjacent pole pairing and also at an area of greater mass of outer ring 310) and in a tangential line to hub 315, maximizes an amount of force that can be transferred along the respective spoke 610, 620 between outer ring 310 and hub 315 thus maximizing possible compressive force or minimizing expansive force, as the case may be, along spoke 610, 620 without causing lateral bending movement or flexion of spoke 610, 620.

Figure 7:
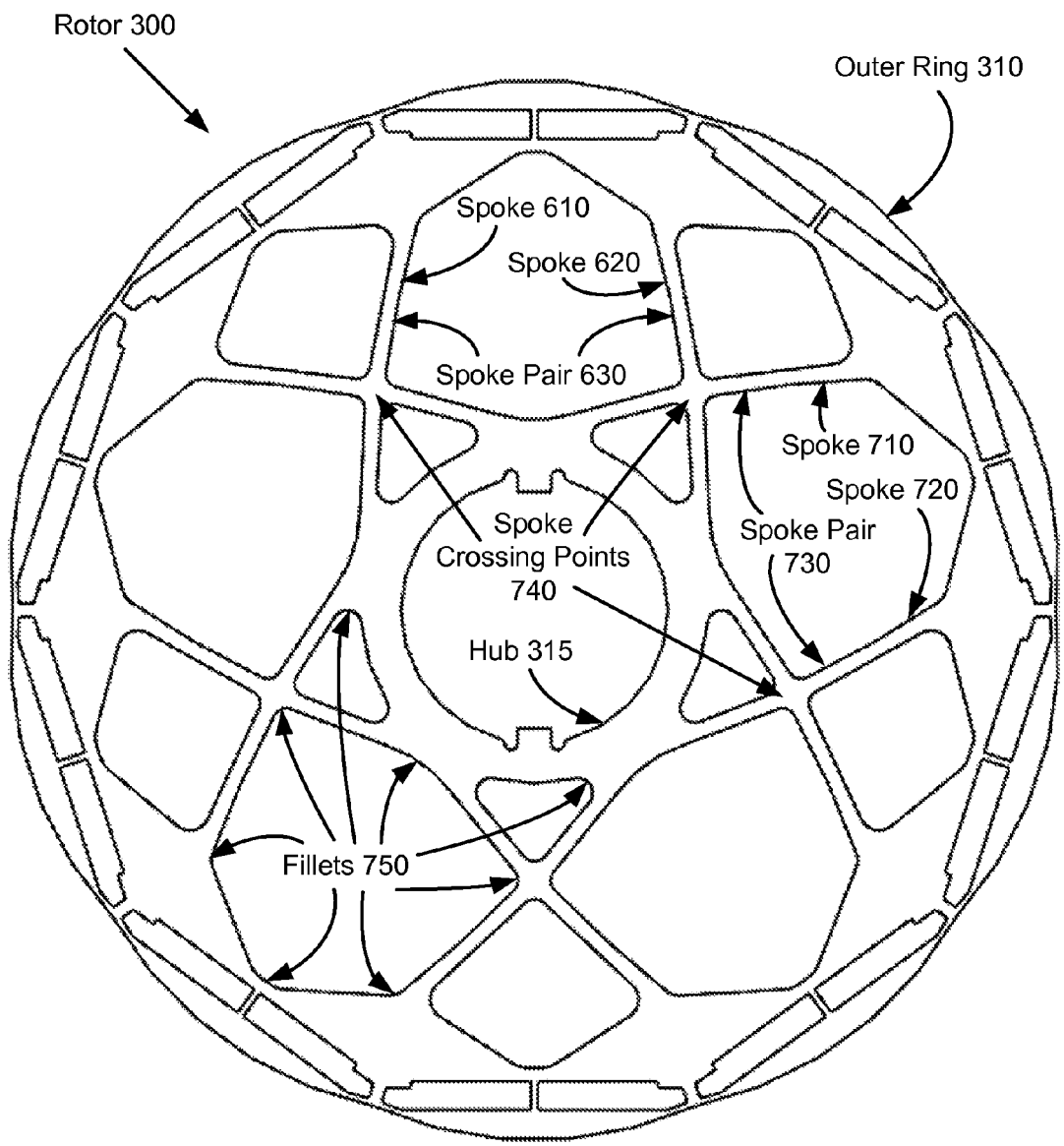
FIG. 7 is an end view of a reduced weight rotor according to a further embodiment.

However, although two spokes of a given pair of spokes doe not cross each other the design of rotor 300 is a one cross spoke pattern, as was stated above and as will now be more fully explained. Referring now to FIG. 7, the pattern of a pair of non-crossing spokes connecting a neighboring or adjacent pair of lobes of outer ring 310 in tangential lines to hub 315 as shown in FIG. 6 can now be more readily discerned in the overall rotor design. While the two spokes of a given spoke pair 630 (e.g., a counterclockwise spoke 610 and clockwise spoke 620) do not cross each other, they do cross spokes of neighboring or adjacent spoke pairs in a one cross spoke pattern. To be clear, as is known in the art of wheel design, a one cross spoke pattern is a pattern where each spoke crosses only one other spoke in connecting a flange to a rim. This pattern is shown in FIG. 7 where, despite spoke 610 and spoke 620 of spoke pair 630 do not cross each other, spoke 620 does cross spoke 710 of a pair of spokes 730 comprising counterclockwise spoke 710 and clockwise spoke 720. As can be seen in the figure, this pattern repeats around rotor 300 where each spoke of a given pair does not cross each other but does cross a single spoke of an adjacent or neighboring pair thereby creating the one cross spoke pattern. As should now be clear, this pattern is therefore neither a simple or random pattern of openings in a solid rotor design nor is it simply a repeating pattern having no correspondence to the physical relationships of other elements of rotor 300. Instead, it is a specific pattern that, in combination with the other design elements of rotor 300 described and shown herein:

1) Provides lobed material adjacent a magnetic pole pairing thereby maximizing magnetic flux where it is most needed;

2) Provides a physically strong connection between the spokes and the lobed portions of the outer ring of the rotor;

3) Provides, for each pair of spokes, an offsetting pair of tangential connections at the hub thereby maximizing rotor strength along lines of expansive or compressive force to/from the outer ring and the hub and minimizing possible lateral bending or flexion of the spokes.

4) Provides a rotor with a one cross spoke pattern having crossing or cross-bracing points 740 between the various crossed spokes thus further minimizing possible lateral bending or flexion of the spokes.

5) Provides a specific relationship of one spoke per lobe/magnetic pole pairing.

6) Minimizes or reduces the amount of material needed to manufacture the rotor while still providing a desired or required level of structural integrity.

A further refinement of the rotor design of the present approach can also be seen in FIG. 7. In particular, fillets (rounded contours) 750 are included at one or more points on the rotor including the various spoke crossing points 740, where the spokes connect to the hub, where the spokes connect to the lobes, and at midpoints between adjacent lobes along an inner portion of the outer ring of the rotor. While not required to achieve the above benefits, such fillets serve to make it easier to manufacture such a rotor, particularly in the case, as is known in the art, of manufacturing via a stamped construction where sharp edges/corners can be problematic.

A still further refinement of the rotor design of the present approach can also be seen in the figures where each spoke of a given pair is slightly arced or bowed outward. For example, referring again to spoke pair 630 in FIG. 6, spoke 610 is shown slightly arced outward in a counterclockwise fashion while spoke 620 is shown slightly arced outward in a clockwise fashion. In one embodiment, with spokes that are 2.5 mm wide and 50 mm long, the arc of each spoke is 0.8 mm off from a straight line. Although straight spokes can be used in the present rotor design, this slight arc of each spoke has additional strength characteristics. For example, if counterclockwise force is being experienced by rotor 300, compressive forces along spoke 610 are more readily handled by the slight counterclockwise arc of spoke 610 than if spoke 610 was completely straight. Likewise, if clockwise force is being experienced by rotor 300, compressive forces along spoke 620 are more readily handled by the slight clockwise arc of spoke 620 than if spoke 620 was completely straight. This increased strength property thus results in further reducing spoke width which thus requires less material thus further reducing rotor weight. Of course, in a given embodiment, the spoke sizing may be increased by some safety factor to ensure structural integrity is maintained in light of expected loads or forces in a given application.

In one example implementation of the reduced weight rotor design described herein, simulations run in a Finite Element Analysis (FEA) to test the rotor's structural integrity revealed a Factor of Safety (FoS) or safety factor of more than 7 at 6,000 Revolutions Per Minute (RPM) and more than 2 at 10,000 RPM. The simulations further revealed that with a load case of 7000 RPM the rotor experienced a peak stress of 8550 pounds per square inch (PSI) and a peak displacement of 0.00052 inches, while with a load case of 1770 inch pounds of torque the rotor experienced a peak stress of 2640 PSI and a peak displacement of 0.00051 inches, and with a load case of 10 times the force of gravity (i.e., 10 g's) in a vertical direction the rotor experienced a peak stress of 78 PSI and a peak displacement of 0.00001 inches, all of which were well within stated targets for the rotor.

The disclosed apparatus has been explained herein with reference to several embodiments. Other embodiments will be apparent to those skilled in the art in light of this disclosure. Certain aspects of the described apparatus may readily be implemented using configurations other than those described in the embodiments herein, or in conjunction with elements other than those described herein.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

It is also to be noted that usage herein of the term connect, or other terms using the same root word, is not meant to imply usage of any separate mechanism, apparatus, or means by which separately described portions contact with each other (e.g., the way a given spoke contacts a lobe or hub). Instead, as would be understood by one of skill in the art in light of the teachings herein and despite being characterized as separate portions or elements, such connections occur because they are all generally formed or stamped from a unitary piece of material such as iron in manufacturing the rotor. Of course, this is not intended to imply that physically separate components could not be coupled together in some known fashion although that would tend to increase complexity and possibly weight, both factors generally considered undesirable in this context.

In the foregoing specification, the invention is described with reference to specific embodiments thereof, but those skilled in the art will recognize that the invention is not limited thereto. Various features and aspects of the herein-described invention may be used individually or jointly.

Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A reduced weight rotor for a permanent magnet electric motor, the reduced weight rotor comprising:
   a hub;
   an outer ring configured to hold multiple magnetic pole pairings around a periphery of the outer ring, the outer ring having one lobed portion located adjacent to each one of the multiple magnetic pole pairings, each lobed portion extending inwardly toward the hub;
   and
   multiple pairs of spokes, a total number of the multiple pairs of spokes being equal to a total number of the multiple magnetic pole pairings,
   wherein each individual pair of the multiple pair of spokes is configured such that,
      each spoke of the individual pair is connected at one end to one of the outer ring lobed portions not connected to any other spoke and at another end to the hub thereby forming a generally tangential line to the hub,
      and wherein
      a counterclockwise spoke of the individual pair and a clockwise spoke of the individual pair do not cross, while
      the counterclockwise spoke of the individual pair and a clockwise spoke of another pair of the multiple pair of spokes located counterclockwise to the individual pair do cross,
      thereby forming a one cross spoke pattern of the multiple pair of spokes.

2. The reduced weight rotor of claim 1 wherein the connection of each spoke of the individual pair to one of the outer ring lobed portions is at a mid or high point of the one of the outer ring lobed portions.

3. The reduced weight rotor of claim 1 wherein the connection of each spoke of the individual pair to one of the outer ring lobed portions is directed towards a center of the magnetic pole pairing located adjacent to the one of the outer ring lobed portions.

4. The reduced weight rotor of claim 1 wherein the connection of each spoke of the individual pair to one of the outer ring lobed portions is at a point of maximum flux.

5. The reduced weight rotor of claim 1 wherein each spoke forms a straight line.

6. The reduced weight rotor of claim 1 wherein each spoke forms a small arc.

7. The reduced weight rotor of claim 1 further comprising fillets where spokes cross in the one cross spoke pattern, where spokes connect to the outer ring lobed portions, where spokes connect to the hub, and between adjacent lobed portions.

8. A reduced weight rotor for a permanent magnet electric motor, the reduced weight rotor comprising:
   a hub;
   an outer ring configured to hold a plurality of magnetic pole pairings around a periphery of the outer ring, the outer ring having one lobe located adjacent to each one of the multiple magnetic pole pairings, each lobe extending inwardly toward the hub;
   and
   a plurality of pairs of spokes, wherein the plurality of pairs of spokes is equal to the plurality of magnetic pole pairings,
   wherein each individual pair of the plurality of pairs of spokes is configured such that,
      each spoke of the individual pair is connected at one end to a different one of the outer ring lobes, such that each outer ring lobe is connected to only one spoke and each spoke of the individual pair is connected to an adjacent outer ring lobe, and is connected at another end to the hub thereby forming a generally tangential line to the hub,
      and wherein
      a counterclockwise spoke of the individual pair and a clockwise spoke of the individual pair do not cross, while
      the counterclockwise spoke of the individual pair and a clockwise spoke of another pair of the plurality of pairs of spokes located counterclockwise to the individual pair do cross,
      thereby forming a one cross spoke pattern of the plurality of pairs of spokes.

9. The reduced weight rotor of claim 8 wherein the connection of each spoke of the individual pair to one of the outer ring lobes is at a mid or high point of the one of the outer ring lobes.

10. The reduced weight rotor of claim 8 wherein the connection of each spoke of the individual pair to one of the outer ring lobes is directed towards a center of the magnetic pole pairing located adjacent to the one of the outer ring lobes.

11. The reduced weight rotor of claim 8 wherein the connection of each spoke of the individual pair to one of the outer ring lobes is at a point of maximum flux.

12. The reduced weight rotor of claim 8 wherein each spoke forms a straight line.

13. The reduced weight rotor of claim 8 wherein each spoke forms a small arc.

14. The reduced weight rotor of claim 8 further comprising fillets where spokes cross in the one cross spoke pattern, where spokes connect to the outer ring lobes, where spokes connect to the hub, and between adjacent lobes.

* * * * *